April 12, 1927.
C. S. RICKER
1,624,008
CHANGE SPEED GOVERNOR
Original Filed Jan. 21, 1916   3 Sheets-Sheet 2
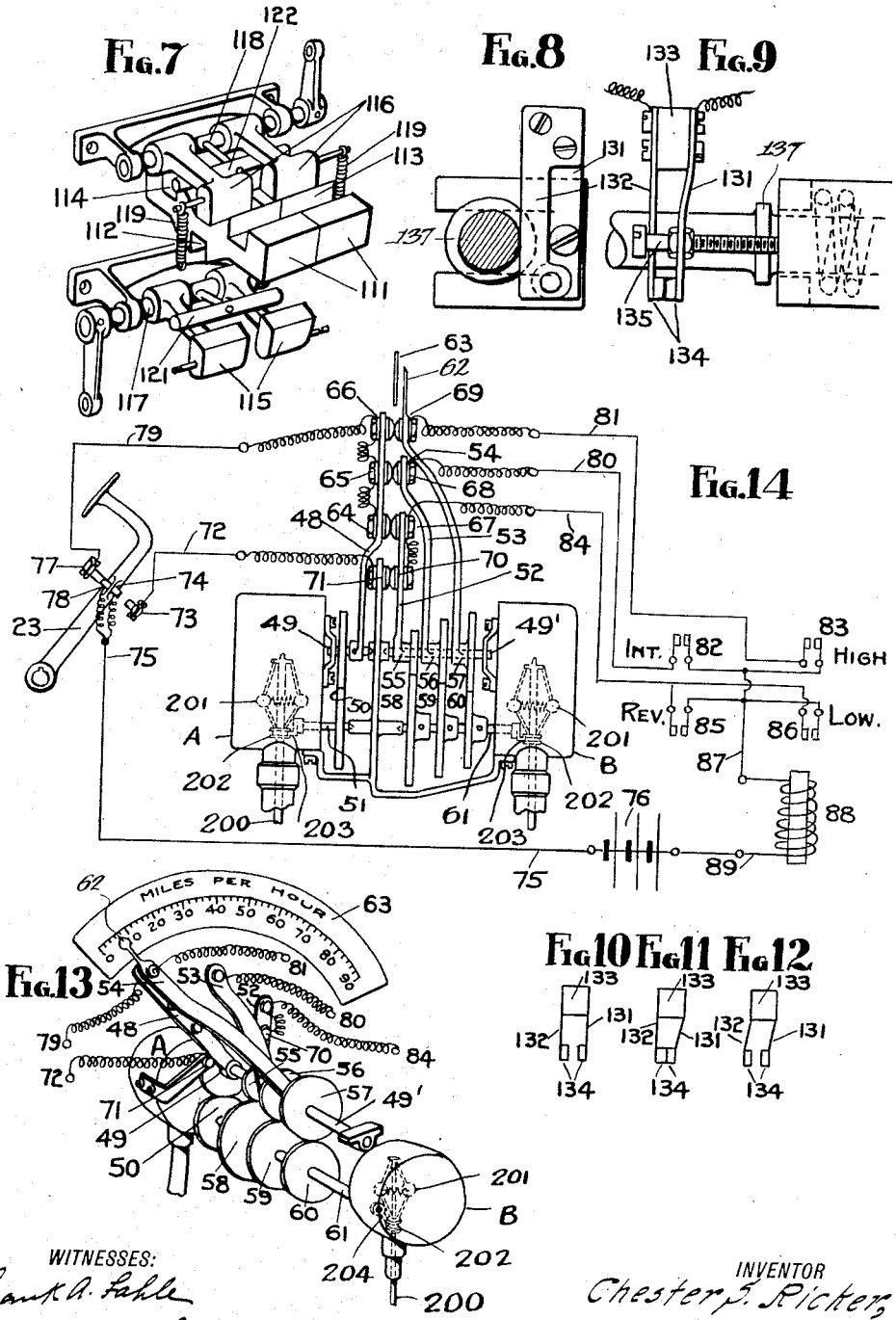

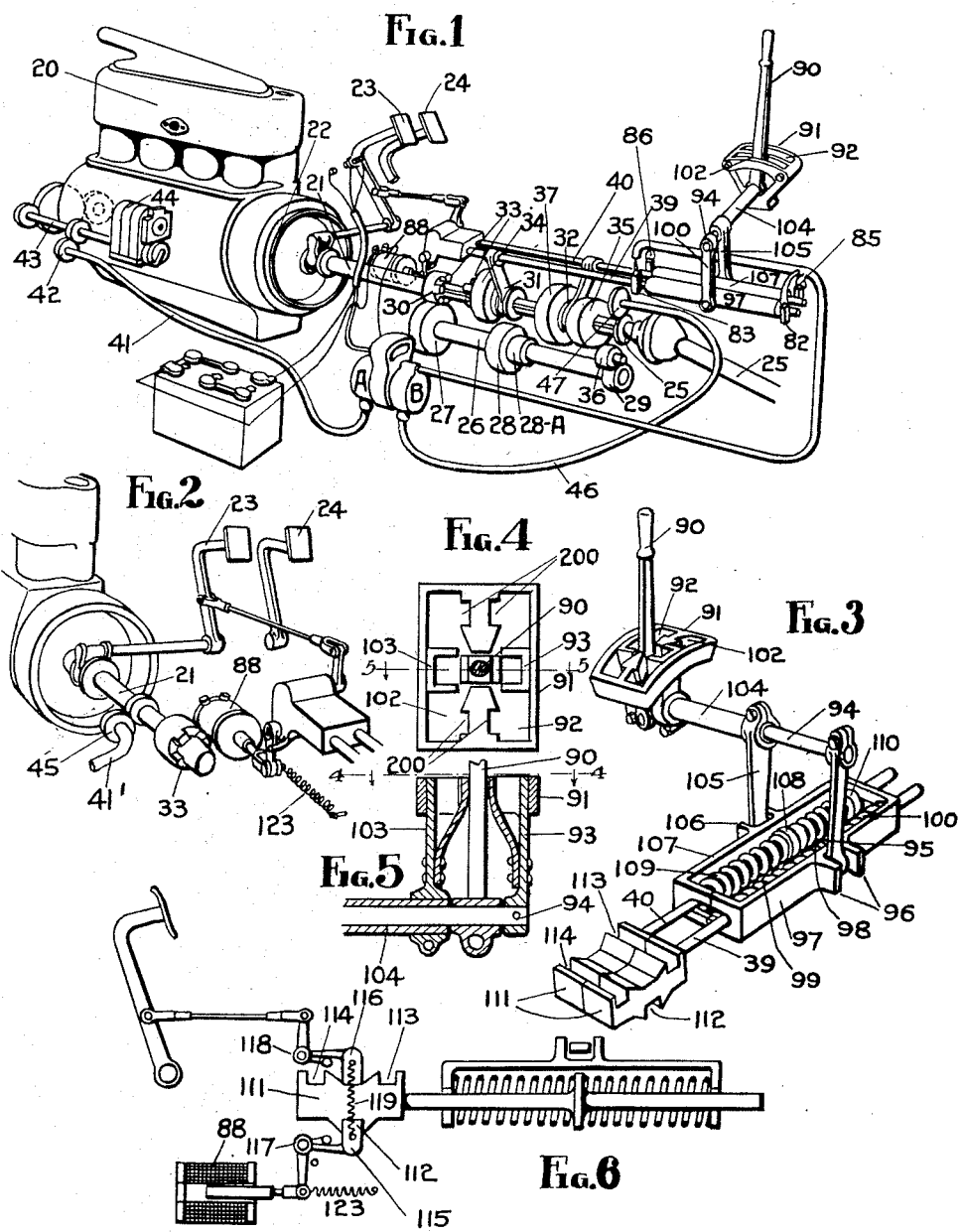

April 12, 1927.

C. S. RICKER 1,624,008

CHANGE SPEED GOVERNOR

Original Filed Jan. 21, 1916    3 Sheets-Sheet 3

WITNESSES:
Frank A. Fahle
Josephine Gasper

INVENTOR
Chester S. Ricker,
BY
Hood & Schley
ATTORNEYS

Patented Apr. 12, 1927.

1,624,008

UNITED STATES PATENT OFFICE.

CHESTER S. RICKER, OF INDIANAPOLIS, INDIANA.

CHANGE-SPEED GOVERNOR.

Application filed January 21, 1916, Serial No. 73,313. Renewed February 9, 1920. Serial No. 357,348.

It is the object of my invention to prevent the possibility of clashing of gears when shifting gears in a change-speed gearing, as in an automobile, and to prevent the jerking of such automobile and its occupants, such as occurs when an improper gear shift is made. In other words, it is the object to ensure that the parts which it is desired to intermesh in a change-speed gearing shall have the same speed at the points where they intermesh before such intermeshing is permitted.

In carrying out my invention, I provide two speed-responsive devices which are respectively responsive to the speeds of the two parts which are to be intermeshed, and by the relative positions taken by said speed-responsive devices control means for supervisorily controlling the production of such intermeshing. When the change-speed gearing provides for a plurality of speeds, as is usual in automobile practice, there will be a plurality of parts for one of the speed-responsive devices, which parts correspond to the different gear ratios, and move inversely as such speed ratios, and these parts will co-operate respectively with the other speed-responsive device for supervisorily controlling the production of the intermeshing for the respective gear ratios to which they correspond. This supervisory control may be obtained in various ways, and in connection with any desired mechanism for producing the intermeshing, whether operated manually or by power.

Figure 15:
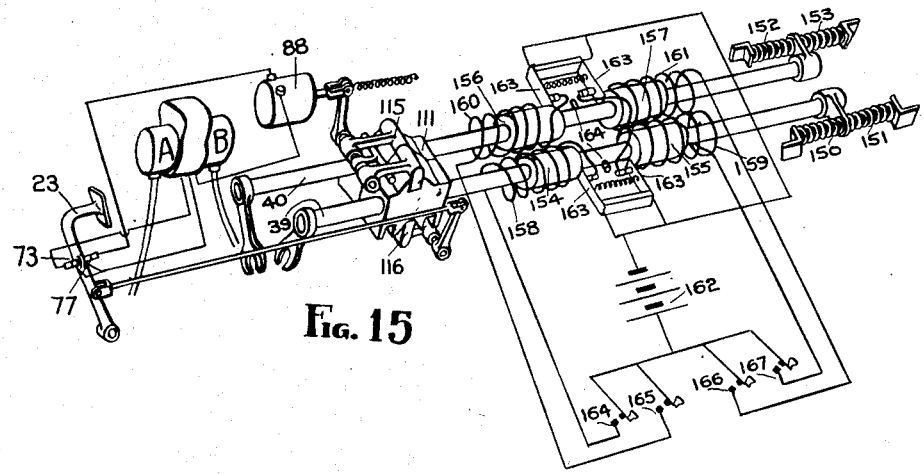
Figure 16:
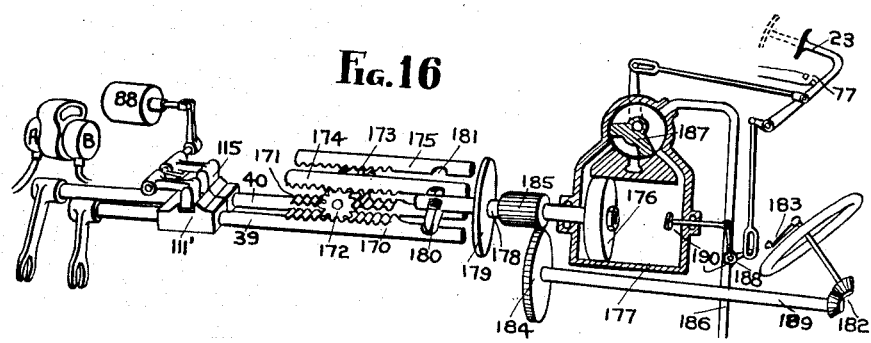
Figure 17:
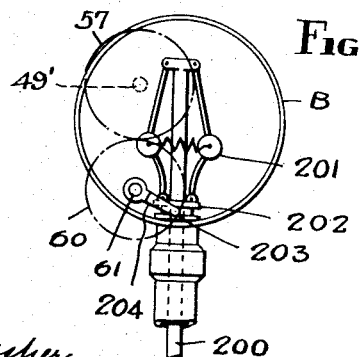

The accompanying drawings illustrate my invention. Fig. 1 is a perspective view illustrating in diagrammatic perspective the connections between the engine and the wheel-driving shaft of an automobile, indicating in outline the application of my invention thereto, with one of the speed-responsive devices driven from the engine; Fig. 2 is a partial perspective view, illustrating the driving of one of the speed-responsive devices from the intermediate shaft between the clutch and the change-speed gearing instead of from the engine; Fig. 3 is a perspective view showing one form of manually operated gear-shifting device, with part of the supervisory control mechanism; Fig. 4 is a section on the line 4—4 of Fig. 5, showing the operating lever and locking quadrants of the gear-shifting device shown in Fig. 3; Fig. 5 is a section on the line 5—5 of Fig. 4; Fig. 6 is a longitudinal section through one of the spring-pressed rods of the gear-shifting device shown in Fig. 3, showing the control devices acting thereon; Fig. 7 is a perspective view of the interlocking mechanism acting on the reciprocating gear-shift rods of Fig. 3, the lower part of such interlocking mechanism being dropped relatively to the rest to illustrate the construction better; Fig. 8 is an end view of one of the control switches; Fig. 9 is a side view of such control switch; Figs. 10, 11, and 12 are diagrammatic views illustrating different positions of such control switch; Fig. 13 is a semi-diagrammatic perspective view showing the speed-responsive devices and their inter-relation; Fig. 14 is a diagrammatic view illustrating the speed-responsive devices and the electrical connections; Fig. 15 is a semi-diagrammatic view showing the application of my invention to a simple form of electrically-operated gear shift; Fig. 16 is a similar semi-diagrammatic view showing the application of my invention to a pneumatically-operated gear shift; and Fig. 17 is a view of a centrifugal speed-responsive device which may be used in connection with my invention.

The crank shaft of the engine 20 is connectible to an intermediate shaft 21 by a clutch 22 operable by the usual clutch pedal 23, located on the footboard in the usual manner beside the brake pedal 24, and the intermediate shaft 21 extends into the gear box in which is any suitable change-speed gearing by which such intermediate shaft may be connected to the propeller shaft 25 which leads rearwardly and is suitably connected to the driving wheels of the vehicle. The change-speed gearing shown is a standard one, in which there is a counter-shaft 26 on which are fixed four gears 27, 28, 28ᴬ, and 29 of successively decreasing size, the largest gear 27 meshing with a gear 30 fixed on the intermediate shaft 21; and there are two sliding sleeves 31 and 32 mounted on the front end of the propeller shaft 25, which is in alinement with the intermediate shaft 21, which sleeves 31 and 32 are slidable axially of but rotate with the propeller shaft 25; the sleeve 31 when slid forward producing an interlocking of the teeth 33 on such sleeve and on the gear 30 so as to directly connect the shafts 21 and 25 for high speed, and when slid rearward producing the meshing of a gear 34 on such sleeve with the gear 28 to produce an intermediate speed; and the sleeve 32 when slid rearward producing the meshing of a gear 35 thereon with an idler gear 36 constantly in mesh with the gear 29, to produce the reverse drive, and when slid forward producing a meshing of a gear 37 on the sleeve 32 with the gear 28^A to produce low speed forward drive. The sleeves 31 and 32 are connected to two reciprocating rods 39 and 40 so as to be operated thereby. To this point, the construction is standard.

Two speed-responsive devices A and B are arranged to be responsive respectively to the speeds of the shafts in front of and behind the change-speed gearing. These speed-responsive devices may take any suitable form, a number of forms being well known. For example, each speed-responsive device may be a centrifugal device such as illustrated diagrammatically in Figs. 13 and 14. In this form of speed-responsive devices, there is a vertical shaft 200 suitably connected, as by the usual flexible shaft, to the part to the speed of which the device is responsive; this vertical shaft 200 carries fly balls 201 which are moved outward by centrifugal force upon an increase in speed to raise a collar 202 slidable on the shaft 200; this collar 202 co-operates with a finger 203 on an arm 204 on a horizontal shaft (51 or 61) which is thus turned from normal through an angle which is a function of the speed. This form of speed-responsive device is illustrated merely because it is simple in construction and operation. In the arrangement shown in Fig. 1, the vertical shaft of the speed-responsive device A is connected with a flexible shaft 41 and suitable gearing 42 to the shaft 43 of the magneto 44, so that such speed-responsive device is responsive to the speed of the crank shaft of the engine 20, since the magneto is driven at a speed proportionate to that of the engine crank shaft; and in the arrangement shown in Fig. 2, the vertical shaft of such speed-responsive device A is connected by a flexible shaft 41' and suitable gearing 45 to the intermediate shaft 21, so that such speed-responsive device is responsive to the speed of such intermediate shaft 21; the two arrangements are the same in effect while the clutch 22 is engaged. In both arrangements, the vertical shaft of the speed-responsive device B is connected by a flexible shaft 46 and suitable gearing 47 to the propeller shaft 25, so that such speed responsive device is responsive to the speed of such propeller shaft. However, these speed-responsive devices may take various other forms, of which a number are well known. In the arrangement shown, they are of the "pointer" type. The speed-responsive device A has a single pivoted arm 48 mounted on a shaft 49 connected by gearing 50 to the horizontal shaft 51 of such speed-responsive device A, so that the arm 48 will move in a clockwise direction (Fig. 13) as the speed of the engine crank shaft, or of the intermediate shaft 21, rises. The speed-responsive device B has three pivoted arms 52, 53, and 54, mounted respectively on three sleeves 55, 56, and 57 co-axial with the shaft 49 and connected by three sets of gearing 58, 59, and 60 to the horizontal shaft 61 of such speed-responsive device B, so that such arms 52, 53, and 54 will move in a clockwise direction (Fig. 13) as the speed of the propeller shaft 25 rises. These arms are turned by the action of the fly-ball-operated collars 202 upon the fingers 203 on the arms 204 on the horizontal shafts 51 and 61 of the two speed-responsive devices A and B, and the intermediate gearing between such shafts and the arms; the arm 48 being operated from the shaft 51 and the arms 52, 53, and 54 from the shaft 61. The arms 52, 53, and 54 correspond to the low, intermediate, and high gears respectively, and the gearings 58, 59, and 60 produce between the shaft 61 and such arms gear ratios which vary in inverse proportion to the gear ratios produced (in this case) by such three changes of speed in the gear box. The ratio of the gearing 50 bears such relation to the gearing 60 that the arms 48 and 54 move at the same speeds when the change speed gearing is in high gear, or the teeth 33 are in engagement, and the clutch 22 is engaged; in other words, if the shafts 51 and 61 move the same amount for like speeds, the gearings 50 and 60 are identical. In addition, the arms 48, 52, 53, and 54 all register for zero speed, or when both the engine shaft and the shaft 25 are at a standstill. In consequence, the arm 48 registers with the arm 52 for all speeds when the change speed gearing is in low speed, with the arm 53 for all speeds when the change-speed gearing is in intermediate gear, and with the arm 54 for all speeds when the change-speed gearing is in high gear. One of the arms 52, 53, or 54, here arm 54, may be provided with a pointer 62 which moves over a suitably graduated arc-shaped scale 63 to indicate the speed of the vehicle. Hence, on high gear the pointer moves at a speed proportional to that of the rear wheels.

The arm 48 is provided with three contacts 64, 65 and 66 which engage respectively with contacts 67, 68, and 69 on the arms 52, 53, and 54 respectively when the arm 48 is in registry with the arms 52, 53, and 54 respectively. The arm 52 is also provided with a contact 70, which engages a stationary contact 71 when the arms 52, 53, and 54, are in zero position—that is, when the shaft 25 is at a standstill; at at which time the contacts 67, 68, and 69 will all engage the contacts 64, 65, and 66 respectively, if the engine is at a standstill.

The contact 71 is connected by a wire 72 to one side of a switch 73, the movable contact 74 of which is carried by the clutch lever 23 so as to close such switch when the clutch 22 is released, the other side of such switch 73 being connected by a wire 75 to one side of a battery 76. This same wire 75 also leads to one side of a switch 77, the movable contact 78 of which is carried by the clutch lever 23 so as to close such switch when the clutch is set, the other side of such switch 77 being connected by a wire 79 to the three contacts 64, 65, and 66. The contacts 68 and 69 are connected by wires 80 and 81 to switches 82 and 83 respectively, and the contact 67 is connected by a wire 84 to two switches 85 and 86, the opposite sides of the switches 82, 83, 85, and 86 being connected by a wire 87 to one side of a release magnet 88, the other side of which is connected by a wire 89 to the opposite side of the battery 76 from that to which the wire 75 is connected. The switches 82 and 83 are controlled by the reciprocating rod 39 and its operating mechanism, and the switches 85 and 86 by the reciprocating rod 40 and its operating mechanism, in a manner explained hereinafter.

The rods 39 and 40 may be reciprocated in various ways. In the arrangement contemplated in Figs. 1 to 14 inclusive they are shifted by a manually-operated shift lever 90, movable in an H-shaped quadrant or guide plate 91 in the usual selective manner. When the lever is in the slot 92 on one side of this guide plate 91 it is connected to an arm 93 on a shaft 94 which is provided with an arm 95 which takes between two ears 96 on a reciprocating member 97 mounted on the rod 39 and having inturned ends between which and an intermediate collar 98 on the rod 39 are located two compression springs 99 and 100 surrounding such rod. When the lever is in the slot 102 on the other side of this guide plate 91 it is connected to an arm 103 on a sleeve 104 which is mounted on the shaft 94 and is provided with an arm 105 which takes between two ears 106 on a reciprocating member 107 mounted on the rod 40 and having inturned ends between which and an intermediate collar 108 on the rod 40 are located two compression springs 109 and 110 surrounding such rod. Thus when the lever 90 is shifted along either slot 92 or 102, one of the springs 99, 100, 109, or 110 is put under compression tending to shift one of the rods 39 or 40.

The shifting of the rods 39 and 40, however, does not always occur immediately. On each of these rods there is a locking plate 111, which on one side, the bottom in Figs. 3, 6, and 7, is provided with a central locking notch 112, and on the other side, the top in these figures, is provided with two end locking notches 113 and 114. A locking pawl 115 co-operates with the bottom of each locking plate 111, and a locking pawl 116 with the top of each locking plate. There are separate locking pawls 115 and 116 for each locking plate 111. Both locking pawls 115, for in the arrangement shown there are but two plates 111, are pivotally mounted on a common rock shaft 117, and both locking pawls 116 on a common rock shaft 118; and the two locking pawls 115 and 116 which co-operate with each locking plate 111 are spring-pressed toward such locking plate by a spring 119 independently of the pawls co-operating with the other locking plate. The shaft 117 is provided with a lift bar 121 which takes over both locking pawls 115 so as to depress them against the springs 119 when the shaft 117 is turned in a clockwise direction (Fig. 7), and the shaft 118 is provided with a lift bar 122 which takes under both locking pawls 116 so as to lift them against the springs 119 when the shaft 118 is turned in a counter-clockwise direction (Fig. 7).

The shaft 117 is turned in the aforesaid clockwise direction by the release magnet 88, but is normally drawn in the other direction by a spring 123; and the shaft 118 is turned in the aforesaid counter-clockwise direction by the clutch pedal 23 when the latter is pushed to release the clutch 22, said clutch having the usual spring tending to set it, and thus tending to move the shaft 118 in the opposite direction. The locking pawl 115 registers with the locking notch 112 when the associated reciprocating rod 39 or 40 is in its middle position, in which such rod produces no intermeshing of those parts of the change-speed gearing controlled by it; and the locking pawl 116 registers with the notches 113 and 114 respectively when the associated rod 39 or 40 is at the two ends of its movement, where such rod produces one or the other of the two intermeshings which it controls in such change-speed gearing. Thus when the shift lever 90 is operated from neutral position to either end of either slot 92 or 102, where it may be held as long as desired by a retaining notch 200, it produces compression of one of the springs 99, 100, 109, or 110, tending to move the rod 39 or 40 correspondingly, but such rod is prevented from moving by engagement of the locking pawl 115 in the notch 112 of the associated locking plate 111 until the release magnet 88 is energized; and when with the rod 39 or 40 in either end position the shift lever 90 is moved to or beyond neutral position, another of such springs is put under compression tending to move such rod 39 or 40 correspondingly, but the movement of such rod is prevented by the engagement of the locking pawl 116 with the notch 113 or 114 until the clutch pedal 23 is depressed. In either case when the locking pawl 115 is released by the magnet 88, or the locking pawl 116 by depressing the clutch pedal 23, the compressed spring 99, 100, 109, or 110 expands to move the associated rod 39 or 40 in the desired direction.

The switches 82 and 83 are located just beyond the two ends respectively of the member 97, and the switches 85 and 86 are located just beyond the two ends respectively of the member 107. These switches are all similar, so that only one of them is illustrated in detail, in Figs. 8, 9, 10, 11, and 12. Each of these switches comprises two leaf springs 131 and 132, mounted on a block of insulation 133. The inherent resiliency of the springs 131 and 132 normally holds these leaf springs in the position shown in Fig. 10, so that the contacts 134 carried by their free ends are separated. Mounted in the leaf spring 131 is an adjusting screw 135, which is engaged by the cooperating end of the member 97 (or 107) when such member is shifted to its corresponding end position, to bend the spring 131 to the position shown in Figs. 9 and 11 and thus produce engagement of the contacts 134. The leaf spring 132 is in a position to be engaged by a collar 137 on the shift rod 39 (or 40) when the latter is moved to its corresponding end position, to bend the leaf spring 132 to the position shown in Fig. 12 to separate the contacts 134.

The operation of the arrangement shown in Figs. 1 to 14 is as follows:

When the shaft of the engine 20 and the shaft 25 are both stationary, the arms 48, 52, 53, and 54 all register. If the shift lever 90 is in neutral position, and the clutch pedal 23 has been depressed since such setting of the shifting lever 90, thus releasing the pawls 116, the shift rods 39 and 40 and the members 97 and 107 are all in their middle positions, and the switches 82, 83, 85, and 86 are all open, in the positions shown in Fig. 10, and the change-speed gearing is not in mesh for any driving connection. The engine 20 is now started. This causes the arm 48 to move from zero position, and out of registry with the arms 52, 53, and 54, if the speed-responsive device A is driven from the engine shaft as shown in Fig. 1; and to do the same thing if such speed-responsive device is driven from the intermediate shaft 21 as shown in Fig. 2 and the clutch 22 is set. The clutch pedal 23 is now depressed, to release the clutch 22, thus allowing the intermediate shaft 21 to come to rest. The shift lever 90 is now thrown to reverse or low speed position, or it may have been thrown to such position previously if desired, thus shifting the member 107 in one direction or the other and putting the spring 109 or 110 under compression tending to move the shift rod 40 and sleeve 32 in the same direction. The shifting of the member 107 as aforesaid causes such member to engage the screw 135 of the switch 85 or 86, as the case may be, and thus to bend the leaf spring 131 of such switch to the position shown in Figs. 9 and 11 and thereby close the switch. The depression of the clutch pedal 23 closes the switch 73. This completes a circuit from the battery 76 through the wire 75, the switch 73, the wire 72, the contacts 71 and 70, the wire 84, the switch 85 or 86, the wire 87, the release magnet 88, and the wire 89, back to the battery 76. Thus it is necessary to depress the clutch pedal 23 and throw out the clutch 22 in order to intermesh the low or reverse speeds with the shaft 25 at a standstill, as under such circumstances the contact 70 engages the contact 71, and the circuit through such contacts is through the switch 73 which is closed only when the clutch pedal 23 is depressed; for the circuit through the switch 77 and the contacts 64 and 67 cannot be closed with the shaft 25 at a standstill and the engine shaft moving because with the speed-responsive device A driven either from the engine shaft as shown in Fig. 1 or from the intermediate shaft as shown in Fig. 2 the arm 48 is moved from zero position and the contact 64 is out of engagement with the contact 67 if the clutch pedal 23 is elevated to close the switch 77. The closing of this circuit for the magnet 88 causes the energization of such magnet and the withdrawal of the locking pawl 115 from the notch 112 in the locking plate 111 on the shift rod 40, so that the spring 109 or 110 which is under compression may expand and move such rod and the sleeve 32 to produce meshing of the gear 37 with the gear 28$^A$ (for low speed forward) or of the gear 35 with the idler 36 (for reverse). The operator now allows the clutch pedal 23 to rise to engage the clutch 22 gradually, to drive the car forward or backward on low speed. Ordinarily there is but one speed backward. When the clutch 22 is set, the spring 119 draws the locking pawl 116 into the notch 113 or 114 of the locking plate 111 which has been moved by the shifting of the shift rod 40; and such shifting of the shift rod 40 has caused a collar 137 thereon to engage the fingers on the spring 132 of the switch 85 or 86 to move said spring 132 to the position shown in Fig. 12 and must open the switch and break the circuit of the release magnet 88. While the change-speed gearing is for low speed and the clutch 22 is set, the arms 48 and 52 move together in constant registry for all speeds.

Assume that the shift just described was to low speed forward. After sufficient speed has been obtained, it is now desired to shift to intermediate speed. The shift lever 90 is moved from low to intermediate position, in the usual manner, thus shifting the member 97 to one end position and the member 107 to middle position to cause compression of the springs 99 and 109. The shift rods 39 and 40, however, are held from moving by the locking pawl 115 in the notch 112 of the locking plate 11 for the shift rod 39 and by the locking pawl 116 in the notch 113 of the locking plate 111 for the shift rod 40. The shifting of the member 107 closes the switch 82, but the circuit for the release magnet 88 is still open. Then the clutch pedal 23 is depressed, lifting the pawls 116 and allowing the compressed spring 109 to move the shift rod 40 and sleeve 32 back to intermediate position to unmesh the change speed gear. Then the clutch pedal 23 is released, so that it rises to set the clutch 22. The engine is now varied in speed, by reducing its speed in this case, until the arm 48 registers with the arm 53, upon the occurrence of which registry, at whatever speed the parts may be moving, the contacts 65 and 68 engage and complete the circuit through the release magnet 88, such circuit being from the battery 76, through the wire 75, switch 77, wire 79, contacts 65 and 68, wire 80, switch 82, wire 87, release magnet 88, and wire 89, to the battery. This registry does not occur until the gears 34 and 28 are moving at the same peripheral speed. The energization of the release magnet 88 releases the pawls 115, thereby allowing the compressed spring 99 to expand to move the shift rod 39 and sleeve 31 to cause the intermeshing of the gears 34 and 28, which intermeshing takes place without clashing because the gears are moving at the same peripheral speed. The switch 82 is opened to produce de-energization of the release magnet 88 as soon as the shift rod 39 has moved as aforesaid, and the locking pawl 116 drops into the notch 114 to hold such shift rod 39 in the position into which it has been shifted.

In a very similar manner, the change-speed gearing is shifted from intermediate to high speed. First the shift lever 90 is moved to the high speed end of the slot 92, thus moving the member 97 to compress the spring 100. The locking pawl 116, however, by being in the notch 114, prevents immediate shifting of the sleeve 31. Then the clutch 23 is depressed, raising the locking pawl 116 out of the notch 114. The spring 100 now expands to move the rod 39 to intermediate position, in which position it is caught by the engagement of the locking pawl 115 in the notch 112. Then the clutch pedal 23 is allowed to rise to reset the clutch 22 and close the switch 77. The engine is now varied in speed, in this case by reducing its speed, to produce the same rotative speed of the two sets of clutch teeth 33, which variation brings the arms 48 and 54 into registry. When this registry occurs, which is when such two sets of clutch teeth have the same peripheral speed, the contacts 66 and 69 engage each other and complete a circuit for the release magnet 88, which circuit is from the battery 76, through the wire 75, switch 77, wire 79, contacts 66 and 69, wire 81, switch 83, wire 87, magnet 88, and wire 89, back to the battery. This energization of the magnet 88 releases the pawls 115 from the notches 112, and allows the still partly compressed spring 100 to complete its expansion and to move the shift rod 39 and the sleeve 31 to produce intermeshing of the two sets of clutch teeth 33. This movement of the rod 39 opens the switch 83 and causes de-energization of the release magnet 88.

By similar operations, the change-speed gearing is shifted to produce lower gear ratios, though this involves a speeding up of the engine instead of a slowing down thereof. In every case, when it is desired to shift from one gear to another, the shift lever 90 is moved into position to produce the desired change, thus compressing one or more of the springs 99, 100, 109, and 110, and closing one of the switches 82, 83, 85, and 86. Then the clutch lever 23 is depressed to release the locking pawls 116 and allow the displaced rod 39 or 40 to shift back to middle position, thus completely unmeshing the change-speed gearing; then the clutch 23 is allowed to rise to engage the clutch 22 and the engine is varied in speed, either by raising or lowering its speed as required, until the parts which are to be intermeshed are rotating at the same speed, or in other words until the arm 48 registers with the arm 52, the arm 53, or the arm 54, according as the change being made is to low speed, intermediate speed, or high speed, respectively, upon the occurrence of which registry the contacts 64 and 67, 65 and 68, or 66 and 69 interengage to close the circuit for the release magnet 88 through that one of the switches 82, 83, 85, and 86 which has been closed, and such release magnet releases the pawls 115 and allows the still compressed spring 99, 100, 109, or 110 to expand to shift the rod 39 or 40 to produce the desired intermeshing in the change-speed gearing, which intermeshing takes place in every case without clashing because the parts which move into mesh are moving at the same speed, and the shifting of the rod 39 or 40 opens that one of the switches 82, 83, 85, and 86 which is closed, thus de-energizing the release magnet 88. Thus the change from one speed gearing to another requires that the clutch 22 be set as intermeshing takes place, because only then is the switch 77 closed; while the production of the reverse gear intermeshing, or of low speed gear intermeshing from a standstill, requires that the clutch 22 be disengaged as intermeshing takes place, as only then is the switch 73 closed.

In the arrangement just described, the shift rods 39 are moved manually. They may also be moved by power. Two simple power-operated arrangements are illustrated diagrammatically in Figs. 15 and 16, Fig. 15 showing an electro-magnetic shift mechanism, and Fig. 16 a pneumatic shift mechanism.

In the arrangement shown in Fig. 15, the shift rods 39 and 40, with their locking plates 111 and locking pawls 115 and 116, the release magnet 88 for releasing the pawls 115, the mechanical connections for releasing the pawls 116 when the clutch pedal 23 is depressed, are the same as in the arrangement already described, as are also the two speed-responsive devices A and B and the electrical connections controlling the release magnet 88, though these electrical connections are not illustrated here. Instead of shifting the rods 39 and 40 to their end positions by springs, however, they are provided with centering springs 150 and 151, and 152 and 153, respectively, which tend to hold them in their middle positions, and they are provided with solenoid cores 154 and 155, and 156 and 157, respectively, for solenoids 158 and 159, and 160 and 161, respectively. These four solenoids are supplied from any suitable source of current, such as the battery 162, which may or may not be the same as the battery 76, and are controlled by four push buttons 164, 165, 166, and 167 respectively. These push buttons are located at any convenient position, such as on the steering gear of the automobile. In the circuits of each of these four solenoids there is a switch 163, which is opened by a projection 164 on the associated shift rod 39 or 40 when such shift rod is shifted to the end position by such solenoid. Thus by depressing one of the push buttons, one of the solenoids is energized tending to pull the rod 39 or 40 to an end position, but the shifting of such shift rod does not take place until the clutch 23 has been depressed to permit the centering springs 150, 151, 152, and 153 to first center both shift rods, the clutch pedal 23 has then been allowed to rise to set the clutch 22, and the engine has been varied in speed to produce identical speeds of the two parts of the change-speed gearing which it is desired to intermesh, which is ensured by the speed-remesh, which is ensured by the speed-responsive devices A and B. When this occurs, the electro-magnetic pull by the energized solenoid moves the shift rod 39 or 40 to produce the desired intermeshing in the change-speed gearing when released by the solenoid 88.

In the pneumatically-operated arrangement shown in Fig. 16, there are the same two shift rods 39 and 40, which are provided with locking plates 111' which co-operate with locking pawls 115 operated by a release magnet 88 controlled by the two speed-responsive devices A and B exactly as in the two arrangements already described. In the arrangement shown in Fig. 16, however, the locking pawls 116 are omitted, and the locking plates 111' do not have any notches 113 and 114. The two shift rods 39 and 40 are provided with racks 170 and 171, which are connected by pinions 172 and 173, to two rack rods 174 and 175, the ends of such rack rods all being in the same plane when the rods 39 and 40 are in their middle positions. A piston 176 in a cylinder 177 has a piston rod 178 on which is carried a disk 179 which, when the piston 176 is shifted to the left, or to the position shown, strikes any of the rods 39, 40, 174, or 175 which has been displaced to the right and returns it to the middle position shown. The piston rod 178 is rotatable, and is provided with a latch finger 180 which by such rotation it was made to engage a notch 181 in any one of the rods 39, 40, 174, and 175, though only one at a time, such rotation being produced by a control lever 183 which is connected through bevelled gearing 182, a shaft 189, and a gear 184 to a pinion 185 on such piston rod 178. When the piston 176 is moved to the right, it moves with it that one of the rods 39, 40, 174, or 175 in the notch 181 of which the latch 180 is seated. The piston 176 is shifted in both directions by air pressure, supplied through a suitable pipe 186 from any desired source, such air pressure being admitted to either end of the cylinder 177 by a valve 187 which is operated by the clutch pedal 23. When the clutch pedal 23 is depressed, to release the clutch 22, the valve 187 is moved to the position shown, and a valve 188 in the pipe 186 is opened, to admit air to the right of piston 176 and force such piston to the left so that the neutralizing disk 179 will return the rods 39 and 40 to middle position. When the clutch pedal 23 is allowed to rise, thus resetting the clutch 22, air is admitted to the left of the piston 176, thus tending to move either the rod 39 or 40 to the right, or else the rod 174 or 175 to the right and thus the rod 39 or 40 to the left. Such movement may not immediately take place, however, and does not take place until the engine has been varied in speed to produce identical speeds of the two parts which are to be intermeshed. When such identity of speeds occurs, the speed-responsive devices A and B close a circuit for the releasing magnet 88, the pawls 115 are lifted, and the air pressure becomes effective to move the piston 176 to the right and to produce the desired shifting of the rod 39 or 40 to produce the desired intermeshing in the change speed gearing. As in the other cases, this intermeshing occurs without clashing. When the piston completes its stroke to the right it strikes a plunger 190 which is interconnected with the air valve 188 and closes such valve, thus shutting off the air pressure which moved the piston 176 to the right.

I claim as my invention:

1. In combination, two separately rotatable parts which may be moved into intermeshing engagement, means for moving said two parts relatively to each other to produce such intermeshing engagement, mechanism responsive to the speed of each of said two parts, and means controlled by said two speed-responsive mechanisms for preventing such relative movement to produce such intermeshing engagement save when the speeds of such two parts are equal.

2. In combination, two separately rotatable parts which may be moved into intermeshing engagement, means for moving said two parts relatively to each other to produce such intermeshing engagement, and means controlled by the relative speeds of said two parts for preventing such relative movement to produce such intermeshing engagement save when the two parts are rotating at the same speed.

3. In combination, two separately rotatable parts which may be moved into intermeshing engagement, means for moving said two parts relatively to each other to produce such intermeshing engagement, a latch for normally preventing such relative movement to produce such intermeshing engagement, and means controlled by the relative speeds of such two parts for releasing such latch when such speeds are equal.

4. In combination, two separately rotatable parts which may be moved into intermeshing engagement, means for moving said two parts relatively to each other to produce such intermeshing engagement, a latch for normally preventing such relative movement to produce such intermeshing engagement, mechanism responsive to the speed of each of said two parts, and means controlled by said two speed-responsive mechanisms for releasing said latch when the speeds of such two parts are equal.

5. In combination, two separately rotatable parts which may be moved into intermeshing engagement, means for moving said two parts relatively to each other to produce such intermeshing engagement, electro-magnetically operated means for normally preventing such relative movement to produce such intermeshing engagement, and means controlled by the relative speeds of such two parts for controlling such electro-magnetically operated means.

6. In combination, two separately rotatable parts which may be moved into intermeshing engagement, means for moving said two parts relatively to each other to produce such intermeshing engagement, electro-magnetically operated means for controlling the operation of said moving means, and means for jointly controlling said electro-magnetically operated means manually and by the relative speeds of said two parts.

7. In combination, two separately rotatable parts which may be moved into intermeshing engagement, means for moving said two parts relatively to each other to produce such intermeshing engagement, electro-magnetically operated means for controlling the operation of said moving means, and means for controlling said electro-magnetically operated means by the relative speeds of said two parts.

8. In combination, two separately rotatable parts which may be moved into intermeshing engagement, means for moving said two parts relatively to each other to produce such intermeshing engagement, electro-magnetically operated means for controlling the operation of said moving means, mechanism responsive to the speed of each of said two parts, and means jointly controlled manually and by said two speed-responsive mechanisms for controlling said electro-magnetically operated means.

9. In combination, two separately rotatable parts which may be moved into intermeshing engagement, means for moving said two parts relatively to each other to produce such intermeshing engagement, a latch normally preventing the operation of said moving means to produce such intermeshing engagement, an electro-magnet for releasing said latch, and means controlled by the relative speeds of such two parts for controlling said electro-magnet.

10. In combination, two separately rotatable parts which may be moved into intermeshing engagement, means for moving said two parts relatively to each other to produce such intermeshing engagement, a latch for normally preventing the operation of said moving means to produce such intermeshing engagement, an electro-magnet for releasing said latch, and means controlled by the relative speeds of such two parts for closing the circuit of said electro-magnet when the speeds of such two parts are equal.

11. In combination, two separately rotatable parts which may be moved into intermeshing engagement, means for moving said two parts relatively to each other to produce such intermeshing engagement, a latch for normally preventing the operation of said moving means to produce such intermeshing engagement, an electro-magnet for releasing said latch, mechanism responsive to the speed of each of said two parts, and means controlled by said two speed-responsive mechanisms for closing the circuit of said electro-magnet when the speeds of such two parts are equal.

12. In combination, two separately rotatable parts which may be moved into intermeshing engagement, means for moving said two parts relatively to each other to produce such intermeshing engagement, a latch for normally preventing the operation of said moving means to produce such intermeshing engagement, an electro-magnet for releasing said latch, circuit-closing means controlled by the relative speeds of such two parts, a manually controlled switch, and a circuit for said electro-magnet including both said circuit-closing means and said switch.

13. In combination, two separately rotatable parts which may be moved into intermeshing engagement, means for moving said two parts relatively to each other to produce such intermeshing engagement, a latch for normally preventing the operation of said moving means to produce such intermeshing engagement, an electro-magnet for releasing said latch, mechanism responsive to the speed of each of said two parts, circuit-closing means which is moved to closed position by said two speed-responsive mechanisms when the speeds of said two parts are equal, a manually controlled switch, and a circuit for said electro-magnet including both said circuit-closing means and said switch.

14. In combination, a driving shaft, an intermediate shaft, a clutch between said driving shaft and said intermediate shaft, a driven shaft, a change speed gearing between said intermediate shaft and said driven shaft, said change speed gearing having a plurality of sets of parts which are relatively shiftable into and out of intermeshing engagement to produce different speed ratios, and means jointly controlled by said clutch and by the relative speeds of the shafts on the driving and driven sides of said change speed gearing for preventing the shifting of the parts of any set into intermeshing engagement save when the speeds of the parts which will be intermeshed by such shifting are equal, and save when the clutch is set if the driven shaft is in motion.

15. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, and means controlled by the relative speeds of the shafts on the driving and driven sides of said change speed gearing for preventing the shifting of the parts of any set into intermeshing engagement save when the speeds of the parts which will be intermeshed by such shifting are equal.

16. In combination, a driving shaft, an intermediate shaft, a clutch between said driving shaft and said intermediate shaft, a driven shaft, a change speed gearing between said intermediate shaft and said driven shaft, said change speed gearing having a plurality of sets of parts which are relatively shiftable into and out of intermeshing engagement to produce different speed ratios, and means jointly controlled by said clutch and by the relative speeds of the shafts on the driving and driven sides of said change speed gearing for preventing the shifting of the parts of any set into intermeshing engagement save when the speeds of the parts which will be intermeshed by such shifting are equal and save when the clutch is set if the driven shaft is in motion, and for preventing such shifting to produce the low speed gear ratio when the driven shaft is stationary unless said clutch is released.

17. In combination, a driving shaft, an intermediate shaft, a clutch between said driving shaft and said intermediate shaft, a driven shaft, a change speed gearing between said intermediate shaft and said driven shaft, said change speed gearing having a plurality of sets of parts which are relatively shiftable into and out of intermeshing engagement to produce different speed ratios, two speed-responsive devices respectively responsive to the speeds of shafts on the driving and driven sides of said change-speed gearing, and means jointly controlled by said two speed-responsive devices and by said clutch for preventing the shifting of the parts of any set into intermeshing engagement save when the speeds of the parts which will be intermeshed by such shifting are equal, and save when the clutch is set if the driven shaft is in motion.

18. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, two speed-responsive devices respectively responsive to the speeds of shafts on the driving and driven sides of said change-speed gearing, and means controlled by said two speed-responsive devices for preventing the shifting of the parts of any set into intermeshing engagement save when the speeds of the parts which will be intermeshed by such shifting are equal.

19. In combination, a driving shaft, an intermediate shaft, a clutch between said driving shaft and said intermediate shaft, a driven shaft, a change speed gearing between said intermediate shaft and said driven shaft, said change speed gearing having a plurality of sets of parts which are relatively shiftable into and out of intermeshing engagement to produce different speed ratios, two speed-responsive devices respectively responsive to the speeds of shafts on the driving and driven sides of said change-speed gearing, and means jointly controlled by said two speed-responsive devices and by said clutch for preventing the shifting of the parts of any set into intermeshing engagement save when the speeds of the parts which will be intermeshed by such shifting are equal and save when the clutch is set if the driven shaft is in motion, and for preventing such shifting to produce the low speed gear ratio when the driven shaft is stationary unless said clutch is released.

20. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, latching means for normally preventing relative movement of the parts of any set to produce intermeshing engagement thereof, and means controlled by the relative speeds of the parts which are to be intermeshed for releasing such latching means when such speeds are equal.

21. In combination, a driving shaft, a driven shaft, a change speed gearing between said driving shaft and said driven shaft, said change speed gearing having a plurality of sets of parts which are relatively shiftable into and out of intermeshing engagement to produce different ratios, latching means for normally preventing relative movement of the parts of any set to produce intermeshing engagement thereof, two speed-responsive devices respectively responsive to the speeds of the driving and driven shafts, and means controlled by said two speed-responsive devices for releasing said latching means when the speeds of the two parts of any set which are to be intermeshed are equal.

22. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, electro-magnetically operated means for normally preventing any relative movement of the change-speed gearing to produce intermeshing engagement of any set of parts, and means controlled by the relative speeds of the driving and driven shaft for controlling such electro-magnetically operated means.

23. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, electro-magnetically operated means for normally preventing any relative movement of the change-speed gearing to produce intermeshing engagement of any set of parts, two speed-responsive devices respectively responsive to the speeds of the driving and driven shafts, and two devices controlled respectively by said two speed-responsive devices and co-operating to control said electro-magnetically operated means, said two devices being correspondingly affected upon changes in the same sense in the speeds of said driving and driven shafts, so that said electro-magnetically operated means will prevent intermeshing engagement of any set of parts except when the velocities of the interengaging portions of such set of parts are substantially equal.

24. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, electro-magnetically operated means for controlling the operation of said change-speed gearing, and means for jointly controlling said electro-magnetically operated means manually and by the relative speeds of said two parts.

25. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, electro-magnetically operated means for controlling the operation of said change-speed gearing, and means for controlling said electro-magnetically operated means by the relative speeds of said two parts.

26. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, electro-magnetically operated means for controlling the operation of said change-speed gearing, two speed-responsive devices respectively responsive to the speed of the driving and driven shafts, and means jointly controlled manually and by said two speed-responsive devices for controlling said electro-magnetically operated means.

27. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, electro-magnetically operated means for controlling the operation of said change-speed gearing, two speed-responsive devices respectively responsive to the speed of the driving and driven shafts, and two devices controlled respectively by said two speed-responsive devices and co-operating to control said electro-magnetically operated means, said two devices being correspondingly affected upon changes in the same sense in the speeds of said driving and driven shafts, so that said electro-magnetically operated means will permit intermeshing engagement of any set of parts only when the velocities of the interengaging portions of such set of parts are substantially equal.

28. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, latching means for normally preventing the relative shifting of the parts of any set to produce intermeshing engagement thereof, an electro-magnet for releasing said latching means, and means controlled by the relative speeds of the driving and driven shafts for controlling said electro-magnet.

29. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, latching means for normally preventing the relative shifting of the parts of any set to produce intermeshing engagement thereof, an electro-magnet for releasing said latching means, and means controlled by the relative speeds of the driving and driven shafts for closing the circuit of said electro-magnet when the speeds of the parts to be intermeshed are equal.

30. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, latching means for normally preventing the relative shifting of the parts of any set to produce intermeshing engagement thereof, an electro-magnet for releasing said latching means, two speed-responsive devices respectively responsive to the speeds of the driving and driven shafts, and two devices controlled respectively by said two speed-responsive devices and co-operating to control the circuit of said electro-magnet, said two devices being correspondingly affected upon changes in the same sense in the speeds of said driving and driven shafts, so that said latching means will be released when the velocities of the interengaging portions of such set of parts are substantially equal.

31. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, latching means for normally preventing the relative shifting of the parts of any set to produce intermeshing engagement thereof, an electro-magnet for releasing said latching means, two speed-responsive devices respectively responsive to the speeds of the driving and driven shafts, and means controlled by said two speed-responsive devices for closing the circuit of said electro-magnet when the speeds of the parts to be intermeshed are equal.

32. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, latching means for normally preventing the relative shifting of the parts of any set to produce intermeshing engagement thereof, an electro-magnet for releasing said latching means, circuit-closing means controlled by the relative speeds of the driving and driven shafts, a manually-operated switch, and a circuit for said electro-magnet including both said circuit-closing means and said switch.

33. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, latching means for normally preventing the relative shifting of the parts of any set to produce intermeshing engagement thereof, an electro-magnet for releasing said latching means, two speed-responsive devices respectively responsive to the speeds of said driving and driven shafts, circuit-closing means which is moved to closed position by said two speed-responsive devices when the speeds of the parts which it is desired to intermesh are equal, a manually controlled switch, and a circuit for said electro-magnet including both said circuit-closing means and said switch.

34. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, two juxtaposed speed-responsive devices which are responsive respectively to the speeds of the driving and driven shafts, circuit-controlling contacts carried by said speed-responsive devices and moving to close a circuit when the intermeshable parts of any set of parts of said change-speed gearing are moving at equal speeds, and means controlled by the closing of said circuit by said circuit-closing means for controlling the operation of said change-speed gearing.

35. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, two juxtaposed speed-responsive devices which are responsive respectively to the speeds of the driving and driven shafts, one of said speed-responsive devices having a movable member, and the other of said speed-responsive devices having a plurality of movable members which move unequally but which respectively move in registry with the movable member of the first speed-responsive device when the intermeshable parts of the different sets of intermeshing parts of said change-speed gearing rotate at equal speeds, and means controlled by the registry of the movable member of said first speed-responsive device with the various movable members of the two speed-responsive devices for controlling the movement of said change-speed gearing to produce the corresponding gear ratios between the driving and driven shafts.

36. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, two juxtaposed speed-responsive devices which are responsive respectively to the speeds of the driving and driven shafts, one of said speed-responsive devices having a movable member, and the other of said speed-responsive devices having a plurality of movable members which move unequally but which respectively move in registry with the movable member of the first speed-responsive device when the intermeshable parts of the different sets of intermeshing parts of said change-speed gearing rotate at equal speeds, latching means for holding said change-speed gearing from movement to produce intermeshing of any of the sets of parts thereof, and means controlled by the registry of the moving member of said first speed-responsive device with any movable member of said second speed-responsive device for releasing said latching means to permit movement of said change-speed gearing to produce intermeshing of the corresponding set of parts.

37. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, two juxtaposed speed-responsive devices which are responsive respectively to the speeds of the driving and driven shafts, one of said speed-responsive devices having a movable member, and the other of said speed-responsive devices having a plurality of movable members which move unequally but which respectively move in registry with the movable member of the first speed-responsive device when the intermeshable parts of the different sets of intermeshing parts of said change-speed gearing rotate at equal speeds, latching means for holding said change-speed gearing from movement to produce inter-meshing of any of the sets of parts thereof, means controlled by the registry of the moving member of said first speed-responsive device with any movable member of said second speed-responsive device for releasing said latching means to permit movement of said change-speed gearing to produce intermeshing of the corresponding set of parts, and manual means co-operating with the movable members of said speed-responsive devices for controlling the movement of said change-speed gearing.

38. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, two juxtaposed speed-responsive devices which are responsive respectively to the speeds of the driving and driven shafts, one of said speed-responsive devices having a movable member, and the other of said speed-responsive devices having a plurality of movable members which move unequally but which respectively move in registry with the movable member of the first speed-responsive device when the intermeshing parts of the different sets of intermeshing parts of said change-speed gearing rotate at equal speeds, latching means normally preventing the movement of said change-speed gearing to produce intermeshing of any of its sets of parts, an electromagnet for releasing said latch, and means controlled by the registry of the movable member of said first speed-responsive device with any movable member of said second speed-responsive device for controlling the energization of said electro-magnet.

39. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, two juxtaposed speed-responsive devices which are responsive respectively to the speeds of the driving and driven shafts, one of said speed-responsive devices having a movable member, and the other of said speed-responsive devices having a plurality of movable members which move unequally but which respectively move in registry with the movable member of the first speed-responsive device when the intermeshable parts of the different sets of intermeshing parts of said change-speed gearing rotate at equal speeds, latching means normally preventing the movement of said change-speed gearing to produce intermeshing of any of its sets of parts, an electro-magnet for releasing said latch, manually-controlled switching means, switching means controlled by the registry of the aforesaid movable members, and circuits controlled jointly by said two switching means and controlling said electro-magnet.

40. In combination, a driving shaft, a driven shaft, a change speed gearing between said driving shaft and said driven shaft, said change speed gearing having a plurality of sets of parts which are relatively shiftable into and out of intermeshing engagement to produce different speed ratios, two juxtaposed speed-responsive devices which are responsive respectively to the speeds of the driving and driven shafts, one of said speed-responsive devices having a movable member, and the other of said speed-responsive devices having a plurality of movable members which move unequally but which respectively move in registry with the movable member of the first speed-responsive device when the intermeshable parts of the different sets of intermeshing parts of said change-speed gearing rotate at equal speeds, manually-controlled means for selectively producing a tendency to move said change-speed gearing to cause intermeshing of any of its different sets of parts, means for resisting such tendency, and means for rendering said resisting means inoperative as to the production of a given intermeshing on the occurrence of registry between the movable member of the first speed-responsive device and that movable member of the second speed-responsive device corresponding to the intermeshing under tendency to be produced.

41. In combination, two separately rotatable parts which may be moved into intermeshing engagement, manually controlled means for moving said two parts relatively to each other to produce such intermeshing engagement, electro-magnetically operated means for normally preventing such relative movement to produce such intermeshing engagement, and means controlled by the relative speeds of such two parts for controlling such electro-magnetically operated means.

42. In combination, two separately rotatable parts which may be moved into intermeshing engagement, manually controlled means for moving said two parts relatively to each other to produce such intermeshing engagement, electro-magnetically operated means for normally preventing such relative movement to produce such intermeshing engagement, mechanism responsive to the speed of each of said two parts, and means correspondingly controlled by said two speed-responsive mechanisms for controlling said electro-magnetically operated means.

43. In combination, two separately rotatable parts which may be moved into intermeshing engagement, manually controlled means for moving said two parts relatively to each other to produce such intermeshing engagement, electro-magnetically operated means for controlling the operation of said moving means, and means for controlling said electro-magnetically operated means by the relative speeds of said two parts.

44. In combination, two separately rotatable parts which may be moved into intermeshing engagement, manually controlled means for moving said two parts relatively to each other to produce such intermeshing engagement, electro-magnetically operated means for controlling the operation of said moving means, mechanism responsive to the speed of each of said two parts, and means correspondingly controlled by said two speed-responsive mechanisms for controlling said electro-magnetically operated means.

45. In combination, two separately rotatable parts which may be moved into intermeshing engagement, manually controlled means for moving said two parts relatively to each other to produce such intermeshing engagement, a latch normally preventing the operation of said moving means to produce such intermeshing engagement, an electromagnet for releasing said latch, and means controlled by the relative speeds of such two parts for controlling said electro-magnet.

46. In combination, two separately rotatable parts which may be moved into intermeshing engagement, manually controlled means for moving said two parts relatively to each other to produce such intermeshing engagement, a latch for normally preventing the operation of said moving means to produce such intermeshing engagement, an electro-magnet for releasing said latch, mechanism responsive to the speed of each of said two parts, and means correspondingly controlled by said two speed-responsive mechanisms for controlling the circuit of said electro-magnet.

47. In combination, two separately rotatable parts which may be moved into intermeshing engagement, means for producing a tendency to move said two parts relatively to each other to produce such intermeshing engagement, electro-magnetically operated means for normally preventing such tendency when produced from becoming effective to produce such relative movement to produce such intermeshing engagement, and means controlled by the relative speeds of such two parts for controlling such electro-magnetically operated means.

48. In combination, two separately rotatable parts which may be moved into intermeshing engagement, means for producing a tendency to move said two parts relatively to each other to produce such intermeshing engagement, electro-magnetically operated means for normally preventing such tendency when produced from becoming effective to produce such relative movement to produce such intermeshing engagement, mechanism responsive to the speed of each of said two parts, and means correspondingly controlled by said two speed-responsive mechanisms for controlling said electro-magnetically operated means.

49. In combination, two separately rotatable parts which may be moved into intermeshing engagement, means for producing a tendency to move said two parts relatively to each other to produce such intermeshing engagement, a latch normally preventing such tendency when produced from becoming effective to produce such intermeshing engagement, an electro-magnet for releasing said latch, and means controlled by the relative speeds of such two parts for controlling said electro-magnet.

50. In combination, two separately rotatable parts which may be moved into intermeshing engagement, means for producing a tendency to move said two parts relatively to each other to produce such intermeshing engagement, a latch for normally preventing such tendency when produced from becoming effective to produce such intermeshing engagement, an electro-magnet for releasing said latch, mechanism responsive to the speed of each of said two parts, and means correspondingly controlled by said two speed-responsive mechanisms for controlling the circuit of said electro-magnet.

In witness whereof, I have hereunto set my hand at Indianapolis, Indiana, this 19th day of January, A. D. one thousand nine hundred and sixteen.

CHESTER S. RICKER.